United States Patent [19]

Nijsen

[11] Patent Number: 5,224,524
[45] Date of Patent: Jul. 6, 1993

[54] MULTI-VARIABLE REGULATOR HAVING AT LEAST FOUR MECHANICAL PORTS AND SYSTEM PROVIDED WITH SUCH A REGULATOR

[75] Inventor: Andreas J. L. Nijsen, Weerselo, Netherlands

[73] Assignee: Koppens Automatic Fabrieken B.V., Ad Bladel, Netherlands

[21] Appl. No.: 674,645

[22] Filed: Mar. 22, 1991

[30] Foreign Application Priority Data

Mar. 30, 1990 [EP] European Pat. Off. ........ 90200767.3

[51] Int. Cl.⁵ .................................. F16K 11/16
[52] U.S. Cl. .......................... 141/98; 141/206; 141/217; 141/352; 141/392; 137/637; 251/57
[58] Field of Search ............ 251/57; 137/637, 637.1; 141/98, 206–229, 392, 352–355

[56] References Cited

U.S. PATENT DOCUMENTS

| | | | |
|---|---|---|---|
| 3,026,905 | 3/1962 | Nilsson | 137/637 |
| 3,088,489 | 5/1963 | Stacey | 251/57 X |
| 3,113,756 | 12/1963 | Griffo | 251/57 |
| 3,509,915 | 5/1970 | Janshen | 137/637 |
| 3,637,187 | 1/1972 | Burger | 251/57 X |
| 3,809,314 | 5/1974 | Engelke et al. | 236/49 |
| 3,986,482 | 10/1976 | Novak | 119/14.08 |
| 4,058,149 | 11/1977 | Hansel | 141/392 X |
| 4,071,059 | 1/1978 | Hansel | 141/206 |
| 4,467,834 | 8/1984 | Rochat et al. | 137/637 |

FOREIGN PATENT DOCUMENTS

| | | |
|---|---|---|
| 1097676 | 7/1955 | France . |
| 2276627 | 1/1976 | France . |
| 2300283 | 9/1976 | France . |
| 139479 | 1/1980 | German Democratic Rep. ................ 137/637 |
| 1148324 | 4/1969 | United Kingdom . |

Primary Examiner—Ernest G. Cusick
Attorney, Agent, or Firm—Pennie & Edmonds

[57] ABSTRACT

Multi-variable regulator having at least four mechanical ports having a linear transfer function between at least two of the ports. The multi-variable regulator has a body which is movable in three dimensions. Joint structure connect the body to the ports at three different points on the body. A pneumatic converter controls the position of the body.

13 Claims, 4 Drawing Sheets

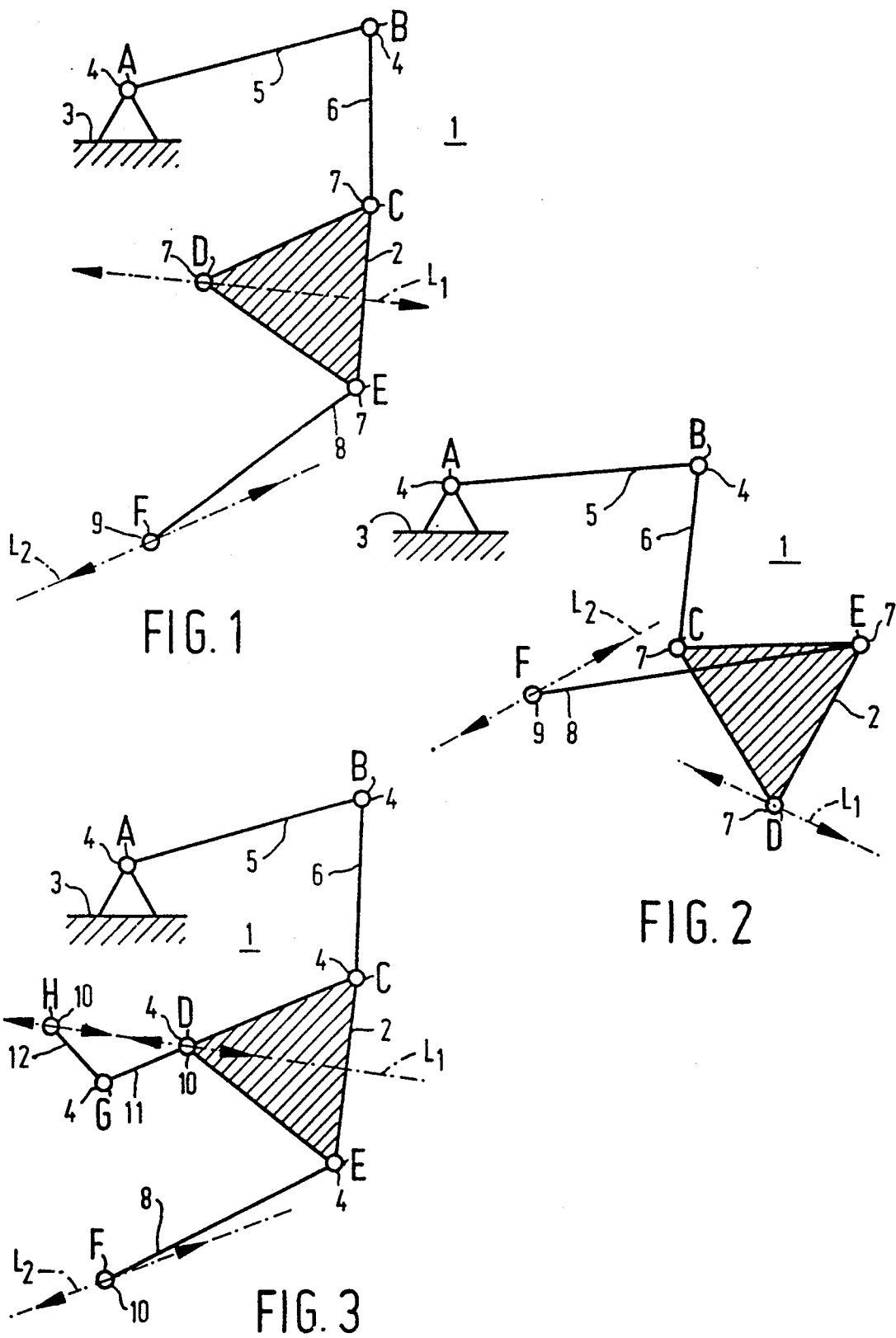

MULTI-VARIABLE REGULATOR HAVING AT LEAST FOUR MECHANICAL PORTS AND SYSTEM PROVIDED WITH SUCH A REGULATOR

BACKGROUND OF THE INVENTION

The invention relates to a multi-variable regulator. Such multi-variable regulators are used in i.a. regulating engine variable and in the processing industry. In general these multi-variable regulators are multi-variable electric regulators having several inlet and outlet ports.

The object of the invention is to provide a type of multi-variable regulator which can function purely mechanically, and which is still able to process a sufficient number of variables to provide an output signal dependent on said variables, which output signal can be used directly for influencing a regulating means, such as a valve.

SUMMARY OF THE INVENTION

In order to accomplish this objective the regulator according to the invention is characterized in that the regulator has at least four mechanically operated ports, and that the transfer function of one of said ports to at least one of the other ports is linear.

The advantage of the multi-variable regulator according to the invention is that it has no electrically controlled components. As a result of this the regulator is safer, in particular when being used as a fuel supply regulator in an environment where there is a risk of an explosion.

One embodiment of the regulator according to the invention is characterized in that the regulator contains a mechanical body coupled to each of said ports, and that said body is movable under the influence of a force exerted on one or more of said ports.

When a force is exerted on one or more of said ports the body makes a movement which is led to the other ports. By exerting a force on one arbitrary port a position of one point of the body is fixed, as a result of which one degree of freedom is suppressed. By suppressing one or more degrees of freedom of the body a transfer from the port or the ports that are used as inlet ports to the remaining mechanical port or ports is realised.

By providing the mechanical coupling between at least three out of four mechanical ports and the body with ball joint means in a further embodiment of the regulator, the body can still move with one degree of freedom.

One preferred embodiment of the regulator according to the invention is characterized in that three out of four carriers of the force vectors of the forces to be exerted on the respective ports lie in substantially one plane.

Since three out of four force vectors lie in one plane, the directions of said vectors do not impede the flatness of the regulator.

In a further embodiment the regulator according to the invention is characterized in that it has a spring which is provided in the regulator in such a manner that it attempts to keep the body in a stable position. In this type of embodiment of the regulator according to the invention it is advantageous that the same spring may furthermore be provided in the regulator in such a manner that it determines the initial positions of two out of four control rods provided on the mechanical ports.

In one embodiment the regulator according to the invention is characterized in that it is provided with at least one guideway, along which a movement of the movable body is guided. Preferably the guideway is designed such that when the body takes the various positions on the guideway, said body only needs to be lifted over a small distance in order to be carried over the unstable equilibrium point.

The advantage of this preferred embodiment of the regulator according to the invention is that because of this it is able to react quickly to an input signal, at the command of which the body must be carried over the unstable equilibrium. At the initiation of said command and when the input signals of the other two ports remain constant the signal in question is led to the remaining port and it may thus be utilized for controlling a process or e.g. a valve.

In yet another embodiment the regulator according to the invention is characterized in that the regulator has a pneumatic converter coupled to the fourth mechanical port, which pneumatic converter is adapted to exert a relatively large force on the fourth port with a small adjustment when the converter is activated.

The advantage of this embodiment of the regulator according to the invention is that is in particular suited for supplying the force for lifting the body in the regulator from a first stable position over the unstable equilibrium point to a second stable position. This namely requires a comparatively much larger force than is needed for keeping the body in the second stable position.

Yet another embodiment of the regulator according to the invention is characterized in that the regulator contains a liquid-filled body having ports in the shape of bellows, which bellows are movable under the influence of forces to be exerted thereon.

The advantage of this simple embodiment of the regulator according to the invention is that by selecting e.g. one of the ports of the regulator as an outlet port, and coupling it with e.g. a valve, said valve can be controlled in multi-dependence on the forces exerted on the other ports. The liquid-filled body will have to be vented, however, and when comparing the case in which the bellows are unloaded with the case in which said bellows are loaded, the material of which the bellows are to be made will have to be so stiff that said material does not bulge too much, this in order to ensure an adequate operation of the regulator.

One preferred embodiment of the system according to the invention is characterized in that the system is suitable for regulating the transport of a medium from a first tank to a second tank, and that it is provided with a feeler coupled to the first port, whose position corresponds with the position taken by a filling nozzle with respect to the opening of the second tank, that the system is provided with a stop valve coupled to the third port for operating the stop valve in dependence on the first, the second and the fourth port, that the system is provided with a control knob coupled to the second port for influencing the transport of medium, and that the system is provided with a pneumatic converter coupled to the fourth port, said converter delivering a command to the fourth port, which is transmitted at the moment that a sub-atmospheric pressure difference indicates that the second tank is substantially full.

By means of the multi-variable regulator and the components coupled thereto a system is obtained which is excellently suited for operating, at the command of three signals, the stop valve only when this is desired, which is made apparent by depressing the control knob when the second tank is not substantially full, which is established by the pneumatic converter, and when the filling nozzle correctly joins up with in particular the second tank. If one of said three conditions is not met, this will be expressed, as a result of the multi-linear behaviour of the regulator, in a change of the signal to the third mechanical port, as a result of which the stop valve will turn off and the transport of medium is stopped, until all three conditions are met again.

In general the system and the regulator can be used in those cases where a process must be controlled in dependence of several, in particular three, but possibly also four or more input variables.

The application of the system in a filling station for a medium, such as a powder, a liquid or a gas in e.g. the chemical industry or the processing industry, and in filling stations for fuel deserves special mention. Advantageous is that in particular the regulator is slender and narrow and, moreover, can be mechanically operated particularly simply and thus safely.

The presence of the feeler furthermore ensures a good positioning and coupling of the filling nozzle with respect to the second tank, as a result of which the system is excellently suited for functioning in co-operation with a device which, e.g. when filling up with fuel, simultaneously sucks off the vapour from the second tank. As a result of said good coupling hardly any false air will be sucked in, so that the risk of an explosive mixture e.g. of air and petrol being exhausted is relatively small, which increases the safety when refueling.

BRIEF DESCRIPTION OF THE DRAWINGS

The invention and its further advantages will be explained in more detail with reference to the drawing, in which like numbers in different figures refer to like parts. In the drawing:

FIG. 1 shows a diagrammatic embodiment in plan view of the multi-variable regulator according to the invention, provided with a mechanism having a body which is movable in three dimensions;

FIG. 2 shows a second diagrammatic embodiment of the regulator according to the invention, as a variant of FIG. 1;

FIG. 3 shows a third diagrammatic embodiment of the regulator according to the invention, provided with a mechanism having a body which is movable in the plane of the drawing;

DETAILED DESCRIPTION OF THE INVENTION

Figure 4:
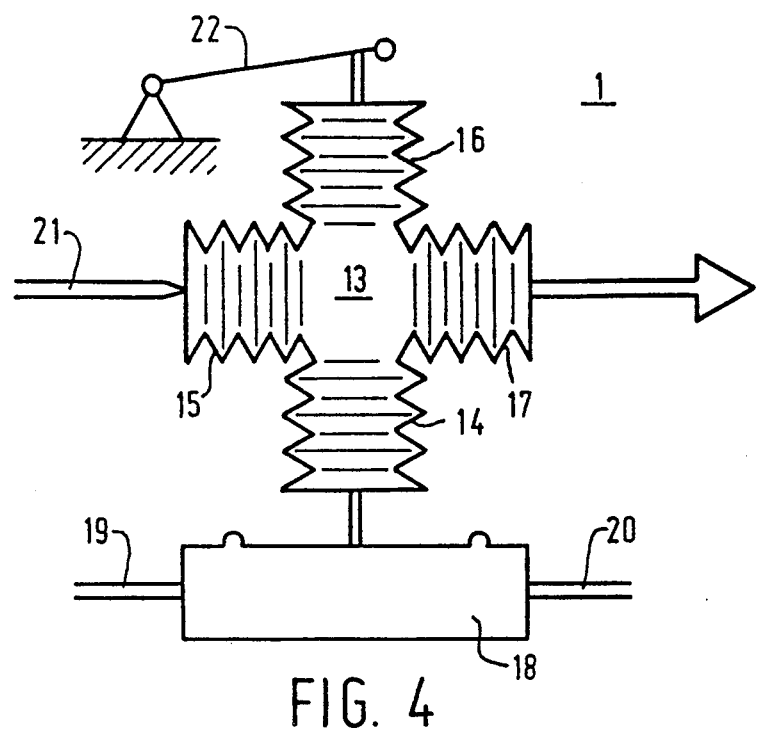
FIG. 4 shows a fourth diagrammatic embodiment of the regulator according to the invention, equipped with hydraulic bellows.

FIG. 1 and 2 diagrammatically illustrate an embodiment of a regulator 1, which is provided with a body 2 which can move in said regulator, said body 2 being movable in three dimensions. The various relevant points are indicated by the capital letters A-F in said Figures. Point A is connected with the surroundings or the frame 3, via a line joint 4 generally known from kinematics. Point A is connected, via a rod 5, with the line joint 4 in point B. Point B is connected, via a rod 6, with ball joint means 7 in point C. Point C as well as the points D and E form part of the body 2, whereby also said other points of the body 2 contain ball joint means 7 in the points D and E. Said points can also be considered to be mechanically operated ports C, D and E of the regulator 2. A force is transmitted to gate E via a rod 8, which rod 8 is connected with a slidable ball joint, in order to make is possible for the carrier of the force to be movable in point F along the line L2. For this purpose point F has a slidable ball joint 9. Also point C contains ball joint means 7, so that the carrier of the force can move along the line L1 at this point.

It is noted that the two embodiments illustrated in the FIGS. 1 and 2 are mechanically equivalent. These two embodiments even contain the same number of the same connections, viz. two line joints, three ball joints and one slidable ball joint. The principles of kinematics and mechanics can then be applied to both embodiments, in each case by considering them in three dimensions. It is generally known that an arbitrary three-dimensional connection inhibits a maximum of three translations and a maximum of three rotations, with an aggregate maximum of five, however, as with six suppressed degrees of freedom there is a fixed connection, whereby two parts can be considered to be one. Thus it is known that one line joint inhibits two rotations and three translations, an aggregate of five degrees of freedom, therefore. Likewise it is known that a ball joint inhibits zero rotations and three translations, which gives an aggregate of three, as it is also known that a slidable ball joint suppresses zero rotations and two rotations, which gives an aggregate of two.

The number of degrees of freedom (v) of a mechanism is in general the number of links (parts) which can be driven independently in order to have the mechanism make a univocal movement. For determining the degree of freedom of movement Grübler has derived the following relationship:

$$v = c(n-1) - b$$

in which:
v = the number of degrees of freedom of movement;
n = the number of links inclusive the frame;
c = the number of separate movements per link;
b = the sum of limitations imposed by the joints of the links,
whereby for this sum it applies:

$$b = \sum_{i=1}^{5} p_i \times i_v$$

in which:
iv = the number of limitations per joint; and
Pi = the number of joints having i limitations.

It is furthermore noted that for three-dimensional mechanism it applies that c=6 (three translations and three rotations), and that for two-dimensional mechanisms it applies that c=3 (two translations and one rotation).

In the case of the mechanism shown in FIGS. 1 and 2 Grübler's formula gives:

$$v=6(5-1)-21=3$$

it applies hereby that the value of b is given by:

$$b=(1\times 2)+(3\times 3)+(2\times 5)=21.$$

In order to have the body 2 make an unequivocal movement, being the movement by port D on the line L1 in this case, there are three degrees of freedom, therefore, casu quo number of parts to be driven independently. In the case of FIG. 1 these are:

Rotation of the rod 5, with respect to the frame 3, about the joint A;

Translation of the slidable ball joint 9 along the line L2; and

Translation of the ball joint 7 in point D, perpendicularly to the plane of the drawing.

As regards the freedom of movement of the mechanism of FIG. 2, it is noted that the first two degrees of freedom correspond with those of the mechanism of FIG. 1, and that in the embodiment of FIG. 2 point C can carry out a translation in a plane perpendicularly to the drawing, so that the body rotates about DE.

If it is desirable to increase the number of degrees of freedom with a certain application of the regulator, e.g. to four, in which case the regulator will have five ports, therefore, it may e.g. be decided to replace a ball joint by a slidable ball joint. In the three-dimensional case it applies then:

$$b=(2\times 2)+(2\times 3)+(2\times 5)=20$$

and therefore $$V=6(5-1;-20=4.$$

To this further variants for increasing the number of ports can be developed.

A two-dimensional view is best explained with reference to FIG. 3, in which reference numbers corresponding with those in FIGS. 1 and 2 indicate like elements, be it in two dimensions. In the points A, B, C and E there are provided joints 4, and in the points E and F there are now provided slidable joints 10.

Applying Grübler's formula to this mechanical construction gives:

$$v=3(5-1)-10=2,$$

whereby $$b=(2\times 1)+(4\times 2)=10.$$

In order to have the mechanism make an unequivocal movement, a movement from joint D along the line L1 in this case, there are two parts to be driven independently from each other, therefore, viz.:

Rotation of the rod 5 about point A; and

Translation of point F along the line L2.

Adding a third degree of freedom by means of a two-dimensional mechanism influences the complexity, however, since extra parts must be added, as will be explained in more detail hereinafter. Said extra parts are added in point D in the shape of an extra rod 11, which is connected with point G, and an extra rod 12, which is connected with point H. The points A, B, C, E and D hereby contain joints, whilst slidable joints are provided in the points E, H and D. The point D thus contains two connections, viz. a joint and a slidable joint, for connection of the body 2 to the rod 11 and to the frame 3 respectively. In that case the application of Grübler's formula gives:

$$v=3(7-1)-15=3$$

whereby $$b=(3\times 1)+(6\times 2)=15$$

It is obvious that when a two-dimensional solution is chosen the use of the multi-variable regulator 1 will require more parts, as a result of which the risk of defects is increased and, moreover, more space will be required for placing the regulator. For that reason a regulator has been designed having a body 2 which is movable in three dimensions.

A simple and flat solution is presented in FIG. 4, however, which shows an embodiment of the mechanical regulator 1 which is equipped with a body 13, which contains ports in the shape of bellows 14, 15, 16 and 17. The body 13 is filled with a liquid which generally is degassed, and the bellows 14, 15, 16 and 17 are flexible. The bellows 14 is connected with a pneumatic converter 18, which has two pressure pipes 19 and 20. The bellows 14 will be compressed at the moment when a sub-atmospheric pressure difference between the outside air and the pressure pipes 19, 20 can move said bellows. The bellows 15 is coupled to a feeler 21, by means of which e.g. the position of a filling nozzle with respect to an opening of a tank (not shown) can be sensed, whilst the bellows 16 is coupled to the control knob 22. When the bellows 16 is compressed, by depressing the control knob 22, the bellows 14, 15 and 18 will generally be slightly moved. In case also a command in the shape of a movement is communicated to the feeler 21, the bellows 15 will also be moved, as a result of which the bellows 17 is moved further. When the bellows 14 is moved upwards, by a spring (not shown), caused by the absence of a suitable pressure in the pressure pipes 19 and 20, the outgoing movement of the bellows 17 increases, as a result of which a medium valve (not shown) can be opened. Only when three command signals are communicated to the bellows 14, 15 and 16, said valve will open. When on the other hand one of said commands to the bellows 14, 15 and 16 drops off, said valve will close. Provided it is properly vented and provided there is not too much clearance on the bellows 14, 15 and 16 the regulator 1 equipped with a hydraulic body 13 will be exceptionally well suited for being utilized in a control station e.g. a filling station for fuel. If desired, it is of course also possible with certain applications to use a regulator having more than four bellows.

Figure 5:
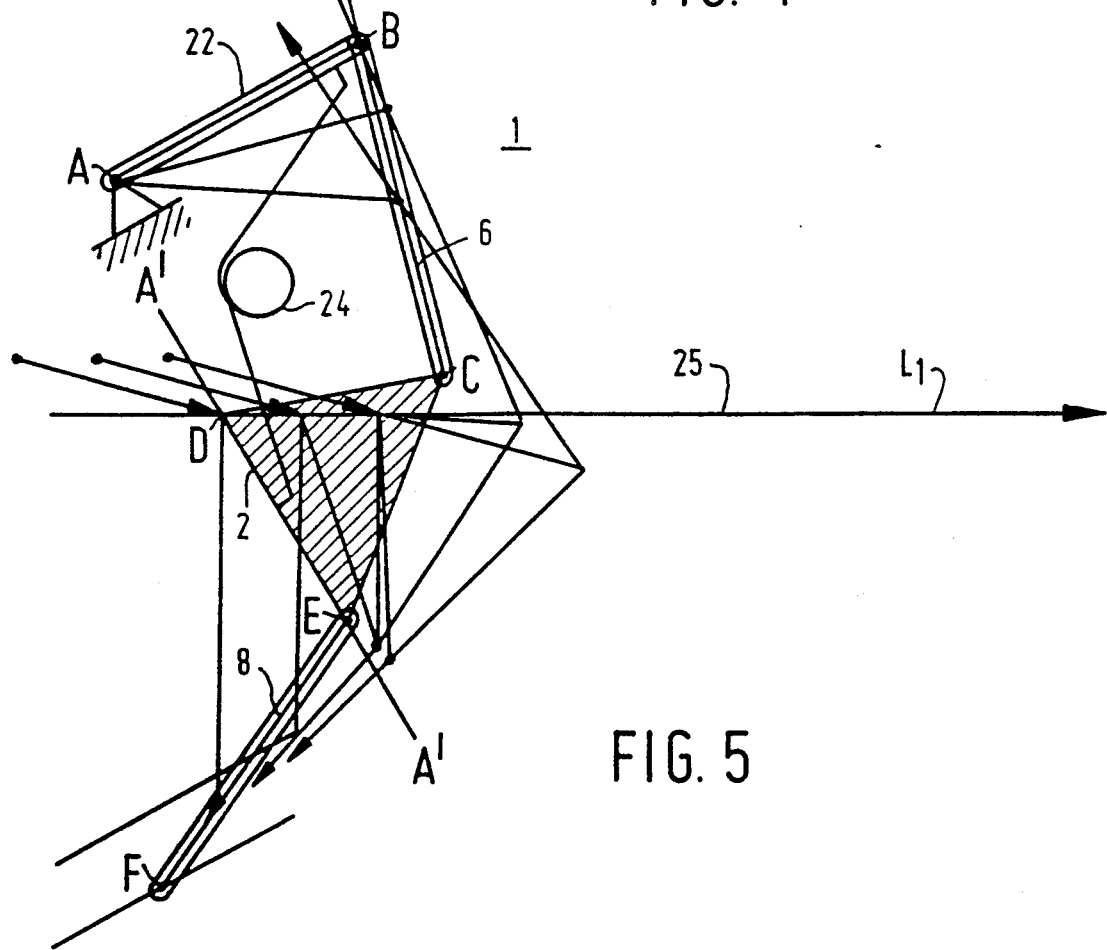
FIG. 5 shows a projection of the regulator according to FIG. 1 in a flat plane, in which forces possibly occurring in various positions of the body are indicated.
Figure 6:
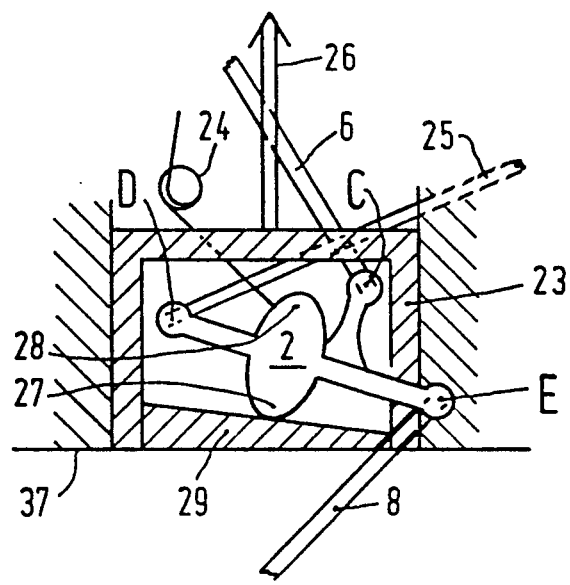
FIG. 6 shows a partial section along the line A'—A' in FIG. 5.

Returning to the embodiment of the regulator 1 with the body 2 which is movable in three dimensions, FIG. 5 shows the location of the various force vectors in a number of positions which the body 2 can take, illustrated in the flat plane. FIG. 6 shows a concrete embodiment of the body, along the line A'—A' in FIG. 5, wherein the body 2 is a body which is movable in three dimensions. FIG. 5 shows a number of possible positions of the body 2, in case a force is exerted on the control knob 22, and at the same time the position of the feeler 21 is maintained, indicating that the filling nozzle (not shown) makes contact with the opening of the tank (likewise not shown). In that case the movement of the control knob 22 is transmitted to the port D, so that there will be a movement along the straight line L1.

So far it has not been explained in what manner the body 2 makes a movement which is perpendicular to the two other directions of movement that have been explained, in order to make a movement in three dimensions possible. In FIG. 6 a yoke 23 is place around the body 2, which yoke can move upwards between holders 37 (partly shown) in the plane of the drawing of FIG. 6. The body 2 is pressed downwards in the yoke 23 by a spring 24. Said spring 24 will in particular be placed in the regulator 1 in a manner such as appears from FIG. 5. At this location the spring 24 on the one hand has the function of pushing down the body 2, whilst on the other hand the control knob 22 is pressed outwards with respect to the body 2, as a result of which the spring 24 will see to it that point E in FIG. 5 is pressed downwards. The spring 24 therewith determines the stable position of rest of both the body 2 and the two ports C and D. In the ports C, D and E of the body 2 there are provided means 7 functioning as ball joints, said means 7 being connected with the respective control rods 6, 8 and 25, cf. FIGS. 5 and 9. A control rod 25 is coupled both to the ball joint 7, in point D, and to the stop valve 41 illustrated in FIG. 9. By exerting a pressure, in the direction of the arrow, on a rod 26 connected with the yoke 23 the body 2, starting from its first stable initial position, will be lifted over an unstable equilibrium point and be kept in a second stable position, as a result of which the movement of the port C will not be provided to the port D when the control knob 22 is operated. Instead the point E will be moved upwards, irrespective of whether a force is exerted on the port E or not. Three conditions must be met, therefore, before a mechanical command is communicated to the control rod 25 via the port D, viz. the yoke 23 must be kept in the position drawn in FIG. 6 by a force on the rod 26 in a direction opposite to the arrow, the sliding movement of point F must be stopped, and a command must be given by means of the control knob 22. If all three conditions are met the movement of the control knob 22 will be communicated to the control rod 25.

The body 2 is provided with cams 27 and 28, whereby the cam 27 rests on a guide surface 29, which guides the movement of the body 2. The body slopes downwards to the right in the drawing of FIG. 6, so that when the body 2 takes its various positions, only a small distance must be bridged by the yoke 23 for carrying the body 2 over an unstable equilibrium. Said unstable equilibrium results from the fact that when forces are exerted on the ports C, D and E there is a position in which the body tends to tilt across port E. Said tilting point forms an unstable equilibrium for the body 2. It is pushed into a first stable position on the guide surface 29 at the one side of said unstable equilibrium, whilst as a result of an upward movement of the yoke 23 the body is lifted over said unstable position into another second stable position. In said other stable position the cam 28 makes contact with the upper side of the yoke 23.

Figure 7:
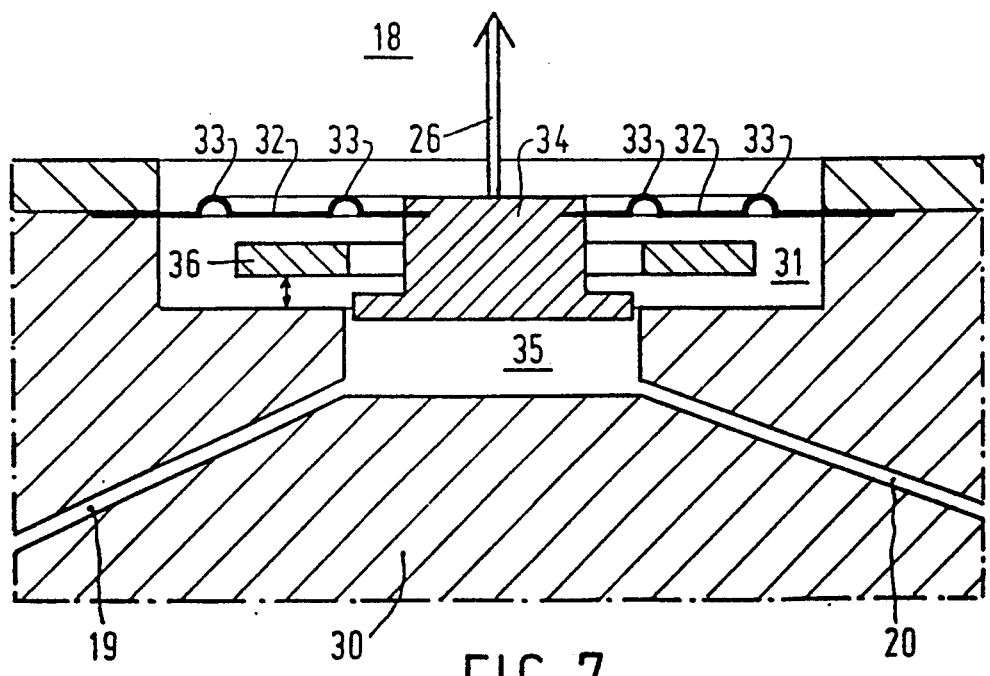
FIG. 7 shows a first embodiment of a pneumatic converter, which is suitable for use in the regulator according to the invention.
Figure 8:
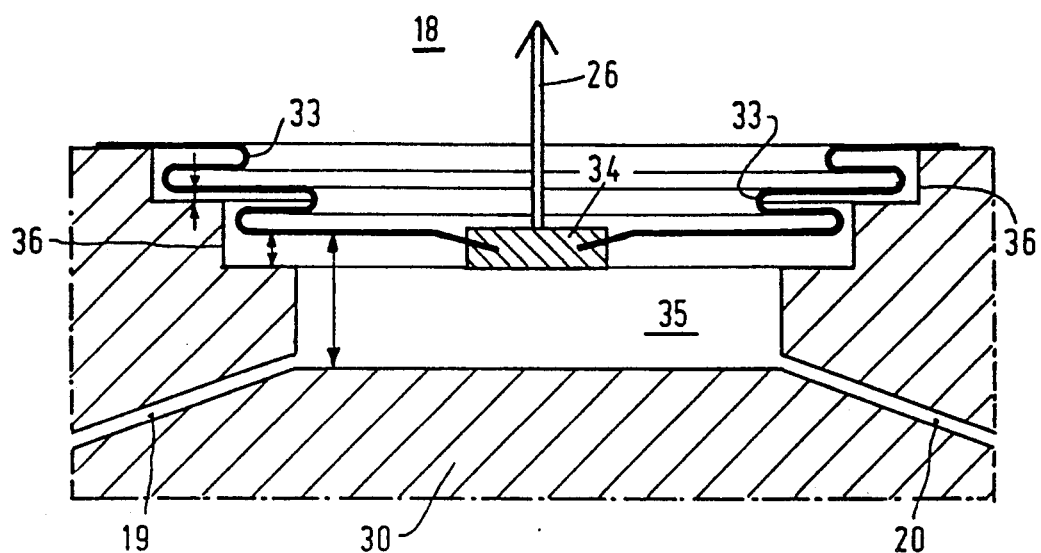
FIG. 8 shows a second embodiment of said converter, which is suitable for use in the regulator according to the invention.

FIGS. 7 and 8 illustrate possible embodiments of the pneumatic pressure/force converter 18, which are suited for cooperation with the regulator 1, in particular for carrying the movable body 2 over the unstable equilibrium by means of the rod 26. The embodiment of FIG. 7 contains a cylindrical part 30 (partially illustrated), in which there is provided a cavity 31. In the cavity 31 there is suspended a flexible membrane 32, which is provided with local protrusions 33. In the flexible membrane 32 there is suspended a movable element 34, which can move in longitudinal direction. A portion 35 of the cavity is connected to the pressure pipes 19 and 20. In the cavity 30 there are provided means which, when the movable element 34 moves downwards in the drawing of FIG. 7, partially stop the movement of the flexible membrane 32, as a result of which less force is required for maintaining the relevant position of the element 34 when said element 34 moves further downwards. The downward movement of the element 34 takes place as a result of a pressure difference in the pressure pipes 19 and 20 and the cavities 31 and 35 being in communication therewith with respect to the surrounding space, causing the element 34 to move downwards. Said pressure difference is effected at the moment that, when a liquid is transported from a first tank to a second tank, the liquid level in the second tank is so high that it will shut off the pressure pipe 19. Because a sub-atmospheric pressure is present in the other pressure pipe 20, a sub-atmospheric pressure is produced in the cavity portion 31 and 35, causing the element 34 to move downwards. The element 34 is connected with the rod 26 and said rod 26 is coupled to the movable body 2, in the manner just explained with reference to FIG. 6, so that when the rod 26 moves upwards in FIG. 6 the body 2 is lifted over its unstable position and consequently port D, possibly coupled by a spring (not shown) will move to the left in FIG. 5 and shut off the stop valve coupled thereto. The means which interfere with the movement of the flexible membrane 32 have been given the reference number 36. Because of the presence of said means 36 the converter delivers a larger force to the rod 26 from its rest position than in the position in which said rod 26 is further inserted in the part 35. The means 36 shown in FIG. 7 may for example have the shape of an annular disc provided in the cavity 31.

In the embodiment illustrated in FIG. 8 the converter 18 contains a cavity 35 accommodated in the cylindrical part 30. The cavity 30 has stepped walls, which constitute the means 36, which take up an increasing force when a movable element 34 moves downwards, as a result of which a decreasing force is thus made available to the rod 26 connected with the movable element 34. The downward movement of the element 34 is effected again in that a suitable pressure difference between the air in the pressure pipes 19 and 20, which are provided in the cylindrical portion 30, and the surrounding air is realized.

Figure 9:
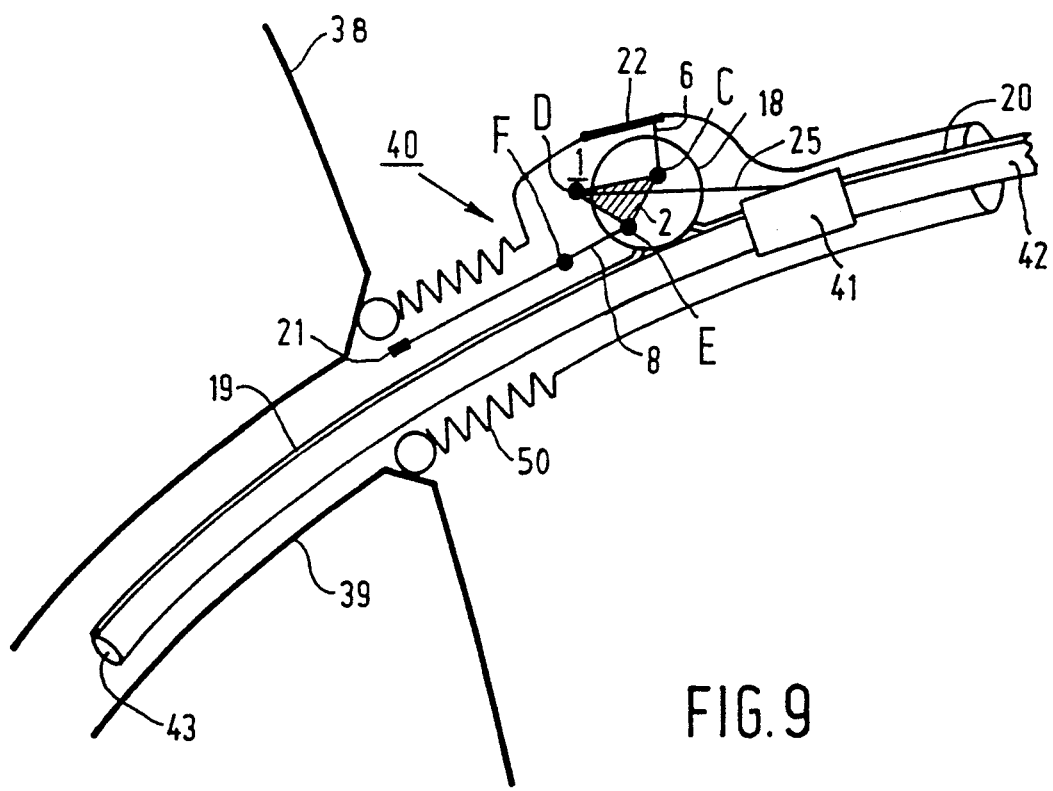
FIG. 9 shows a system for filling up with fuel, provided with a regulator according to the invention.

FIG. 9 illustrates a part of a system 37, which is in particular suitable for filling up with fuel. An advantageous property of this embodiment is that with an optimal force/travel characteristic only a minimal quantity of air needs to be sucked out of the space 35 (FIG. 8), which results in a minimal response time of the converter 18. Reference number 38 indicates the part of a vehicle in which a spout 39 is provided, said spout opening into a second tank (not shown). Fuel is transferred from a first tank (not shown), via a filling nozzle 40, to said second tank. The regulator 1 is accommodated in the nozzle 40, which regulator 1 mechanically operates, via the command rod 25, the valve 41 accommodated in said nozzle 40. The medium valve 41 shuts off the supply of fuel from a fuel pipe 42 to a fuel pipe portion 43. Furthermore the pneumatic converter 18 with the pressure pipes 19 and 20 are diagrammatically illustrated. Reference number 21 indicates a portion of the feeler which takes care of it that a flexible part 50 is compressed when the end of the nozzle 40 is inserted in the spout 39, as a result of which the feeler 21 is displaced and the port E in the regulator 1 is moved. When the pressure difference between the pipes 19 and 20 and the surrounding space does not indicate that the second tank is full the converter 18 will stay in its rest position, as a result of which the command rod 25 will move when the control knob 22 is depressed, causing fuel to flow through the pipes 42 and 43.

Variants, obvious to a person skilled in the art, which may be developed on the basis of the above, are considered to fall within the scope of the claims hereunder.

I claim:

1. Multi-variable regulator, characterized in that the regulator has at least four mechanically operated ports, with one of said ports having a linear transfer function to at least one of the other ports; a mechanical body coupled to each of said ports, said body being movable under the influence of an eternal force exerted on one or more of said ports; at least three out of four of said ports being mechanically coupled to each other; and said body including ball joint mans coupling at least some of the ports to said body.

2. Regulator according to claim 1, characterized in that said body is movable under the influence of an external force exerted on any one of said four ports and three out of four of the forces exerted on the respective ports lie in substantially one plane.

3. Regulator according to claim 2, characterized in that the force exerted on the fourth port is exerted substantially perpendicular to the remaining three forces exerted on the other three ports.

4. Regulator according to claim 1, characterized in that the body in the regulator can be carried over an unstable equilibrium by exerting a force on one of the ports.

5. Regulator according to claim 4, characterized in that by exerting a force on the fourth mechanical port the body can be carried over said unstable equilibrium.

6. Regulator according to claim 1, characterized n that said regulator includes a spring which is provided in the regulator for normally maintaining the body in a stable position.

7. Regulator according to claim 6, characterized in that each of the four ports includes a control rod connected thereto and said spring in the regulator urges two out of four of said control rods into a first position.

8. Regulator according t claim 7, characterized in the regulator is provided with a guideway, along which a movement of the movable body is guided.

9. Regulator according of claim 8, characterized in that said guideway is shaped such that when the body takes the various positions on the guideway, only a small distance needs to be bridged in order to carry said body over the unstable equilibrium point.

10. Regulator according to claim 1, characterized in that the regulator includes a pneumatic conveter coupled to the fourth port, which pneumatic converter is adapted to exert a relatively large force on the fourth port with small displacement of said port when the converter is activated.

11. Regulator according to claim 10, characterized in that said pneumatic converter includes an element movable from a rest position under the influence of a sub-atmospherics pressure difference to create a pressure force; a flexible membrane suspending said element in the converter; and interference means located in the path of flexing of said flexible membrane, whereby, when the element moves from the rest position, an increasing portion of the pressure force resulting from the pressure difference is taken up by said interference means which interferers with the flexing of said flexible membrane and the movement of the element from its rest position.

12. Regulator according to claim 1, characterized in that the regulator includes a liquid-filled body and said ports are each defined by and have the shape of a bellows, each of which is movable under the influence of forces to be exerted thereon.

13. A system for regulating the transport of a medium through a fuel nozzle from a first tank to a second tank to fill said second tank, said system including a multi-variable regulator according to claim 3 characterized in that the system includes a feeler coupled to said first port for providing a signal corresponding with the position taken by said filling nozzle with respect to an opening in said second tank; a control knob coupled to said second port for providing a control signal for controlling the transport of said medium; a pneumatic converter coupled to said fourth port for delivering a signal to said fourth port which is transmitted at the moment that a sub-atmospheric pressure difference indicates that said second tank is full; and a stop valve coupled to said third port and operable in dependence on said signals on the first, second and fourth ports, respectfully.

* * * * *